United States Patent [19]

Turbak

[11] 3,961,086

[45] June 1, 1976

[54] PROCESS FOR IMPROVING STORAGE LIFE OF MEAT

[75] Inventor: Albin F. Turbak, Convent Station, N.J.

[73] Assignee: Tee-pak, Inc., Chicago, Ill.

[22] Filed: Mar. 12, 1974

[21] Appl. No.: 450,525

[52] U.S. Cl. ............................. 426/240; 426/325; 426/326; 426/412; 426/511
[51] Int. Cl.² ............................................. A23B 4/14
[58] Field of Search ............ 426/240, 320, 511, 324, 426/325, 521, 410, 415, 335, 532

[56] References Cited
UNITED STATES PATENTS

| | | | |
|---|---|---|---|
| 2,370,768 | 3/1965 | Baerwald | 426/236 |
| 3,266,909 | 8/1966 | Ellis | 426/324 |
| 3,574,642 | 4/1971 | Weinke | 426/415 |
| 3,681,092 | 8/1972 | Titchenal | 426/410 |
| 3,713,849 | 1/1973 | Grindrod | 426/415 |

FOREIGN PATENTS OR APPLICATIONS

| | | | |
|---|---|---|---|
| 488,638 | 1941 | United Kingdom | 426/320 |

OTHER PUBLICATIONS

Refrigeration Engineering, June 1956, pp. 39–49, 98, Combining Gammon Radiation, Refrigeration –Brownell.

*Primary Examiner*—Hiram H. Bernstein
*Attorney, Agent, or Firm*—Paul Shapiro; Joseph E. Kerwin; William A. Dittmann

[57] ABSTRACT

The storage life of fresh meat normally subject to deterioration is extended by wrapping the meat in a first film which is permeable to a sterilizing agent but impermeable to bacteria, injecting a sterilizing agent through said first film for killing at least a substantial proportion of the bacteria on the surface of the meat, and then enclosing the sterilized meat in a second film which is substantially impermeable to oxygen for retarding aerobic bacterial growth.

7 Claims, No Drawings

PROCESS FOR IMPROVING STORAGE LIFE OF MEAT

DESCRIPTION OF THE PRIOR ART

In present day slaughter house operation, animals are dressed and often cut into large sections referred to as "primal cuts" for shipment to various users such as the military and local butcher shops. The primal cuts then are cut into smaller sections for retail sale and consumption. It is not uncommon during the shipment of these large cuts of meat, even under refrigeration, for the product to shrink due to moisture loss or for the meat to spoil as a result of microbial growth, contamination, and sliming. Spoiling, of course, results in substantial waste of the meat product.

It has been proposed to extend the storage life of large cuts of meat, particularly under refrigeration, by enclosing these cuts in an oxygen impermeable film, flushing the bag with an inert gas, and then sealing. This technique largely extends the storage life of meat by reason that aerobic bacterial growth is reduced because of the absence of oxygen. One of the basic disadvantages of this technique, however, is that any anaerobic bacteria present may grow without control.

It has been proposed to extend the storage life of large cuts of meat by washing the surface of the meat with a sterilizing agent, e.g., a dilute solution of sodium hypochlorite and water, and then wrapping the meat in paper. This technique is suitable for reducing spoilage of the meat due to surface bacteria but it does not prevent the problem of shrinkage due to moisture loss from the meat or the recontamination of the meat by bacteria in the air.

A more recent technique for extending the storage life of large cuts of meat and suggested as being useful for military applications involves the washing of the meat with a tripolyphosphate salt of the type suited for preserving meat, wrapping the meat in a polyethylene film, and then irradiating the meat with a radioactive cobalt source in a proportion of 100 – 200 Krad. This procedure, of course, kills substantially all of the bacteria in the meat. The basic problem with this technique was that the meat could undergo recontamination due to bacteria in the air or shrinkage due to loss of moisture.

SUMMARY OF THE INVENTION

This invention relates to a method for extending the storage life of fresh meat which is normally subject to bacterial deterioration. The invention comprises the steps of wrapping the meat in a first film which is permeable to a sterilizing agent but impermeable to bacteria, injecting a sterilizing agent through the first film for killing substantially all of the bacteria on the surface of said meat, and enclosing said sterilized meat in a second film which is substantially impermeable to oxygen for retarding aerobic bacterial growth.

The invention has many advantages over those techniques employed in the prior art and include: the ability to substantially extend the storage life 3 – 4 times that normal for large cuts of meat by retarding bacterial growth, sliming, and moisture loss; the ability to sterilize the surface of meat killing both aerobic and anaerobic bacteria while the meat is in a packaged state so that after such sterilization the package can be handled or stored without danger of contamination; the ability to reduce shrinkage of the meat by inhibiting moisture loss during storage; the ability to inhibit aerobic bacterial growth by enclosing the sterilized meat in a film which is substantially oxygen impermeable; the ability to reduce waste due to spoilage and contamination; and the ability to employ a number of inexpensive sterilizing agents for the sterilizing of the surface of the meat.

DESCRIPTION OF THE PREFERRED EMBODIMENT

The process of this invention can be applied to virtually any type of fresh meat which is normally subject to deterioration, e.g., by bacterial attack and by moisture loss. Most of the meats are in the nature of large cuts, i.e., primal cuts, because these cuts are normally subject to storage for a longer period of time than are the smaller cuts normally sold on a retail basis. Beef is the primary meat to which the process of the invention is addressed, although pork is also well suited to the practice of this invention.

The first film which is applied to the meat is an underwrap. It must be of a type that is substantially permeable to a sterilizing agent which is to be employed in the surface sterilization of the meat but impermeable to bacteria. There are many types of polymeric films which are permeable to a variety of sterilizing agents, e.g., steam and liquid sterilizing agents, but are impermeable to bacteria that can be used as an underwrap. As noted in the description of the prior art, many of the previous processes were defective because after initial sterilization the meat product became contaminated by handling or through bacteria in the air. By using a film permeable to a sterilizing agent but impermeable to bacteria, it is possible to sterilize the meat without danger of recontamination even though the environment is not aseptic. This aspect is particularly advantageous because it is difficult to maintain an environment in which aseptic conditions exist. Examples of polymeric films which are permeable sterilizing agents and impermeable to bacteria include regenerated cellulose and polyolefin films such as polyethylene or polypropylene. Of these polymeric films, regenerated cellulose is preferred as it permits the use of an extremely inexpensive sterilizing agent.

The second film which is placed over the sterilized, wrapped sections of meat is of the type which is substantially impermeable to oxygen. By that, it is meant that the film has an oxygen vapor transmission rate of less than about 1 cc./100 in$^2$/24 hour-atm. The wrapping of the sterilized meat in a film having substantial impermeability to oxygen provides not only for the inhibiting of aerobic bacterial growth in the cut of meat but prevents substantial moisture loss in the meat during storage. These films also are substantially impermeable to the transmission of water vapor. Examples of oxygen impermeable films are saran and polyester films.

Saran films which are preferred are copolymers of vinylidene chloride and other monomers such as vinyl chloride, vinyl acetate, acetonitrile, methyl methacrylate, methyl acrylate, etc. The polymerized vinylidene chloride represents the major proportion of the copolymer, an 85% vinylidene chloride content in the copolymer being typical. Mylar polyester films may also be used inasmuch as they have excellent oxygen barrier properties. Saran and Mylar films, being difficult to heat-seal, are often used in the form of laminates to films that are easily heat-sealed, e.g., nylon, polyethylene, polypropylene, and other polyolefins, etc. Saran-coated heat-sealable films, e.g., saran-coated nylon, polyethylene, polypropylene, ethylene vinyl acetate, etc., may also be used.

A variety of materials, e.g., gases or liquids, have been used as sterilizing agents and can be used in practicing this invention. The essential requirement of the sterilizing agent is that it pass through the permeable film employed as an underwrap for the meat product. Examples of sterilizing agents include ultraviolet light, ethylene oxide, propylene oxide, sodium hypochlorite solutions, steam, acetic acid, chlorine, bromine, and radiation, e.g., gamma, beta, and radioactive sources.

In practicing the invention, the film and the sterilizing agent must be appropriately selected so that they are compatible with the process. A regenerated cellulose film is a preferred type of film as the underwrap for practicing the invention because it is compatible with a variety of inexpensive sterilizing agents and is easy to use in practicing the invention. Examples of sterilizing agents suited for use with regenerated cellulose films such as cellophane include steam or dilute solutions of sodium hypochlorite in water. Steam is the preferred sterilizing agent as it is readily permeable through the regenerated cellulose film and is effective for destroying the surface bacteria on the meat. Further, there are no problems in the use of steam with respect to toxicity. Steam temperatures of from about 100° – 250°C. are preferred. Temperatures exceeding 250°C. are not preferred because the steam even on short exposure to the cellulose film has a tendency to make it brittle.

Polyolefin films such as polyethylene and polypropylene films are suited for practicing the invention with irradiation from a radioactive source as the sterilizing agent. A typical radioactive sterilizing agent is radioactive cobalt. Although it is possible to kill substantially all of the bacteria in the meat by irradiation, this technique is not preferred for reasons of efficiency and economy. On the other hand, the cellulose-steam treatment is an effective, efficient method.

The exposure time for sterilizing the surface of the meat usually varies in accordance with the strength of the sterilizing agent. In the case of steam, the exposure time varies with the temperature. Conditions for effecting substantially complete destruction of the surface bacteria can be altered as desired. Normally, when using steam at low temperatures, e.g., 100°C., a longer exposure period is required than when higher temperature steam is employed. Typically, an exposure from about ½ – 10 minutes is required. However, the exposure times can be varied as desired.

The following examples are provided to illustrate preferred embodiments of the invention and are not intended to restrict the scope thereof. All percentages are expressed as weight percentages.

EXAMPLE I

A side of beef weighing about 250 pounds is wrapped in a cellophane film. After the meat is wrapped in the cellophane film so that virtually none of the meat is exposed to the air, the packaged meat is subjected to a blast of 150°C. steam for about 2 minutes. Because the cellophane is permeable to steam, the steam can pass through the film and condense on the surface of the meat. This high temperature steam is effective for killing at least the surface bacteria on the meat. After initial sterilization of the meat with steam, the packaged meat can be handled without fear of contamination because of the impermeability of the cellophane film to bacteria.

The packaged meat then is enclosed in an oxygen-impermeable saran film of poly(vinylidene chloride/vinyl acetate) having a vinylidene chloride content of 85%, the enclosed bag then is evacuated to produce a vacuum packaged product and sealed.

The storage life of this packaged meat is substantially longer (e.g., 2 – 3 weeks) than an untreated meat product maintained under the same conditions. In fact, the untreated meat product shows signs of moisture loss and bacterial degradation at one week whereas the treated meat product did not show substantial signs of sliming or contamination over a 30-day period.

EXAMPLE II

A side of beef weighing approximately 200 pounds is wrapped in a cellophane film. A dilute solution of sodium hypochlorite in water (1% sodium hypochlorite) is prepared and the solution applied to the external surface of the cellulose film. The hypochlorite solution permeates the cellulose film and effects sterilization of the surface of the meat. The sterilized meat then is packaged in a saran-nylon laminate and heat-sealed. The storage life of the meat is excellent.

If the saran-nylon laminate overwrap is omitted, the storage life of the meat product is reduced substantially primarily because there is a moisture loss from the meat and because the cellophane film does not inhibit aerobic bacterial growth. The storage life may be reduced by one-third.

EXAMPLE III

A side of pork is wrapped in a polyethylene film and then irradiated from a radioactive cobalt source for a time sufficient to sterilize the surface of the meat. Generally, 1 – 50 Krad is sufficient to achieve sterilization. After sterilization, the meat is wrapped in a saran film and sealed. The resulting packaged meat has an extended storage life relative to untreated meat stored in a refrigerated condition and meat wrapped in a polyethylene film but without the saran overlap. In the latter instance, if the sterilization is incomplete, both aerobic and anaerobic bacteria can grow and effect a more rapid spoiling of the meat.

I claim:

1. A process for improving the storage life of fresh meat primal cuts normally subjected to deterioration which comprises the steps:
   wrapping said meat primal cuts in a first film which is permeable to a sterilizing agent but impermeable to bacteria, then
   diffusing a sterilizing agent inwardly through said first film for killing substantially all of the bacteria on the surface of said meat primal cuts, and then
   enclosing said sterilized wrapped meat primal cuts in a second film which is substantially impermeable to oxygen for retarding aerobic bacterial growth.

2. The process of claim 1 wherein said second film is saran, polyester, a heat-sealable film coated with saran or a heat-sealable film laminated to a saran film.

3. The process of claim 2 wherein said first film is a cellulose film.

4. The process of claim 3 wherein said sterilizing agent is steam having a temperature of at least 100°C. but not exceeding 250°C.

5. The process of claim 4 wherein the surface of the meat primal cut is exposed to steam treatment for ½ – 10 minutes.

6. The process of claim 3 wherein said sterilizing agent is ethylene oxide.

7. The process of claim 2 wherein said first film is polyethylene and said sterilizing agent is irradiation from a radioactive source.

* * * * *